United States Patent [19]
Pietsch et al.

[11] Patent Number: 5,643,026
[45] Date of Patent: Jul. 1, 1997

[54] SAFETY DEVICE FOR SEAL SYSTEMS FOR PROPELLER SHAFTS ON SHIPS

[75] Inventors: Günter Pietsch; Holger Hillig, both of Hamburg; Bodo Voss, Buxtehude; Ernst-Peter Von Bergen, Ahlefeld, all of Germany

[73] Assignee: Blohm + Voss Holding AG, Hamburg, Germany

[21] Appl. No.: 533,554

[22] Filed: Sep. 25, 1995

[30] Foreign Application Priority Data

Sep. 24, 1994 [DE] Germany .................. 44 34 247.1

[51] Int. Cl.$^6$ ............................................. B63H 23/36
[52] U.S. Cl. ............................ 440/112; 416/174; 277/3
[58] Field of Search ..................... 440/112; 416/174; 277/3, 28, 34.3

[56] References Cited

U.S. PATENT DOCUMENTS

| | | | |
|---|---|---|---|
| 3,625,523 | 12/1971 | Gardner | 440/112 |
| 3,934,952 | 1/1976 | Gardner | 440/112 |
| 4,395,141 | 7/1983 | Pietsch et al. | 277/3 |
| 4,984,811 | 1/1991 | Kuwabara et al. | 277/3 |

FOREIGN PATENT DOCUMENTS 374207  6/1989  Germany .

*Primary Examiner*—Jesus D. Sotelo
*Attorney, Agent, or Firm*—Nils H. Ljungman and Associates

[57] ABSTRACT

A safety device on an aft seal system equipped with at least two gaskets for a ship's propeller shaft, which propeller shaft is sealed with respect to the outside water and with respect to a lubricant chamber, and on which a ring-shaped chamber is reserved between each two gaskets, to which chamber are connected a feed line for compressed air and a discharge channel which can be emptied by means of a solenoid valve which opens and closes periodically. The pressure in the ring-shaped chamber is kept always slightly lower than the respective outside water pressure and the lubricant pressure by means of a pressure regulation mechanism. In the feed line to the ring-shaped chamber, downstream of the pressure regulation mechanism there is a solenoid valve, and downstream of that there is an airtight container with a float switch, whereby when the container is full of fluid due to a clogging of the discharge channel, the solenoid valve closes and thereby protects the pressure regulation mechanism and the other units against flooding.

20 Claims, 6 Drawing Sheets

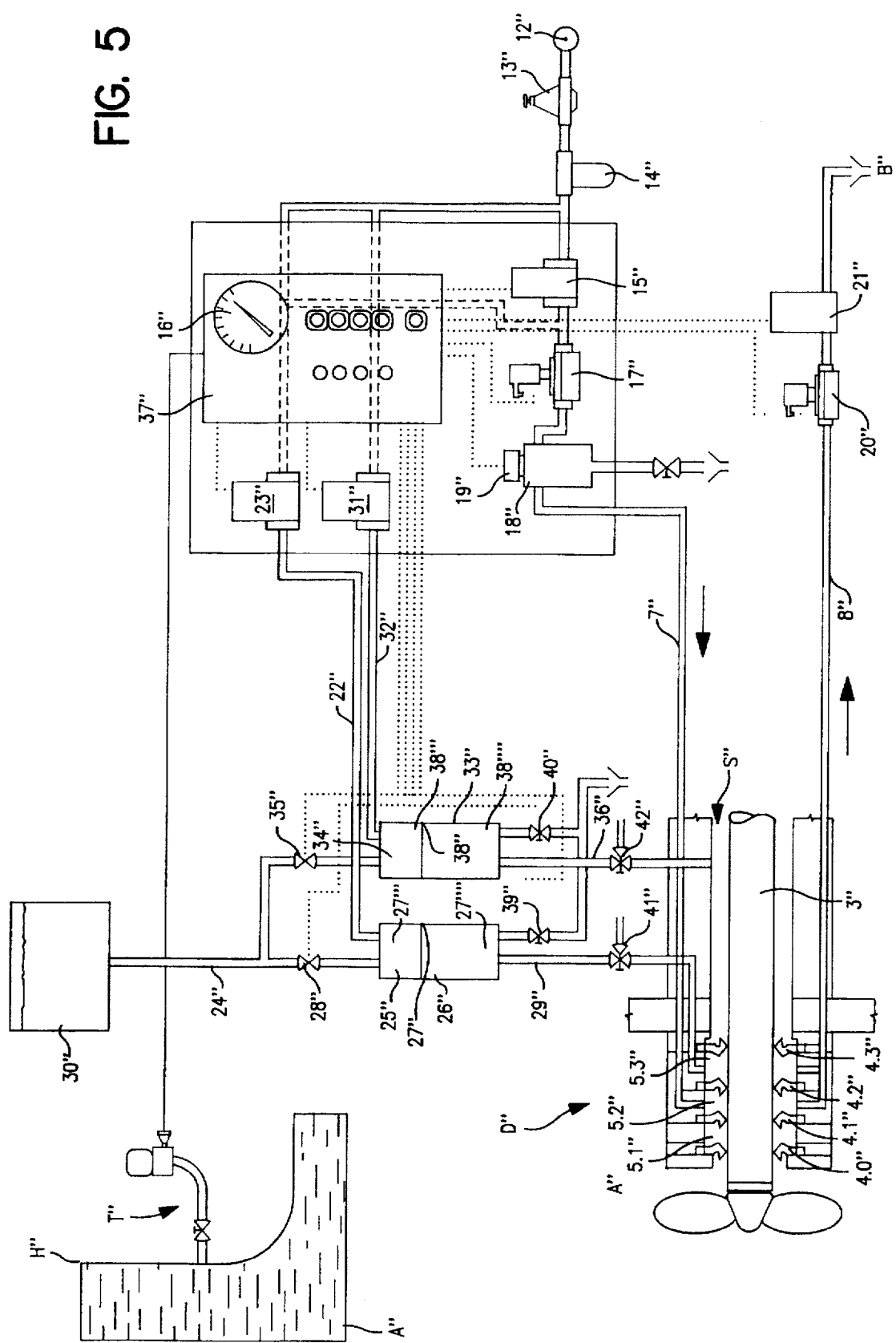

SAFETY DEVICE FOR SEAL SYSTEMS FOR PROPELLER SHAFTS ON SHIPS

BACKGROUND OF THE INVENTION

1. Field of the Invention:

The present invention generally relates to a safety device for systems to seal a ship's propeller shaft against the outside water and against a lubrication chamber with a multiple seal. The safety device can be equipped on the outside water side with at least one gasket directed outward, and on the lubrication chamber side with at least one gasket directed inward. Between each two neighboring gaskets a ring-shaped chamber or annulus is reserved, at least one of which chambers is pressurized via a feed line with a gaseous pressure medium, in particular compressed air, whereby the pressure of the pressure medium, by means of a pressure regulation mechanism interposed in the feed line, can be constantly kept slightly lower than the pressure of the outside water and the pressure of the lubricant.

Further, connected to the pressurized ring-shaped chamber there can be a discharge channel which empties into the interior of the ship (bilge), and in which discharge channel there is a controlled shut-off mechanism, preferably a solenoid valve, which shut-off mechanism automatically and periodically opens and closes. The feed of the lubricant to the lubricant chamber takes place from a deep tank, the static level of which can be adjusted by means of a lubricant feed line.

2. Background Information:

In systems of this type, for example, in the system disclosed in German Patent No. 3742079, which patent is hereby incorporated by reference herein, when there is a blockage in the discharge channel, situations can occur in which, for example, a plug is formed from a water-lubricant emulsion which contains particles of dirt and which plug does not leave the discharge channel in spite of the periodic opening and closing of the first shut-off mechanism. Thus, after a certain length of time in operation, due to the underpressure with respect to the outside water pressure and the lubricant pressure, outside water, and possibly also lubricant, penetrates into the ring-shaped chamber, fills it with fluid, which fluid travels through the feed line to the pressure regulation mechanism, thereby adversely affecting the operation of the latter and/or escaping outward through it, which can result in serious damage, malfunctions and disruptions of operations.

OBJECT OF THE INVENTION

The object of the present invention is to eliminate problems of the type described above, and accordingly to render a seal system of the type described above safer, and more reliable.

SUMMARY OF THE INVENTION

The present invention teaches that this object can be accomplished by providing, in the feed line of the ring-shaped chamber behind the pressure regulation mechanism, a second shut-off mechanism, preferably a solenoid valve. Behind the second shut-off mechanism, there can be a container, which container can be closed externally and can be airtight. The container can have a float switch, which float switch actuates the second shut-off mechanism such that when the float switch is tripped by fluid accumulating in the container, the second shut-off mechanism closes. As a result of the installation of a second shut-off mechanism controlled by a float switch upstream of the pressure regulation mechanism, the pressure regulation mechanism can be protected from being flooded with any fluid which may have penetrated.

In one preferred embodiment of the present invention, a condensate trap and a pressure relief valve can be integrated into the feed line between the pressure regulation mechanism and the pressure source. As a result of this measure, the safety of the system during normal operation can also be increased.

An additional safety measure which can increase the safety of the system during operation is that, if necessary, the first shut-off mechanism can be operated manually and remotely, because it thereby becomes possible to verify the correct operation of the first shut-off mechanism.

Another measure which increases the safety of operation is that, at some distance upstream of the discharge opening into the bilge, a manometric switch can be integrated into the discharge line, which manometric switch can open at atmospheric air pressure and can close in the event of a pressure increase, thereby emitting a visual, electrical signal. This measure can make it possible to promptly detect a clogging of the discharge channel.

Finally, the present invention teaches the installation of a control cabinet in which all the electrical and pneumatic lines of the system can be brought together, whereby this control cabinet can preferably include a switching and control panel on which the display and alarm mechanisms required for the operation and monitoring of the system can be installed.

BRIEF DESCRIPTION OF THE DRAWINGS

Embodiments of the present invention are illustrated in the accompanying drawings, in which:

FIGS. 4 and 5 show a longitudinal section of an aft seal system for a ship's propeller shaft to adjust to the changing draft, plus the corresponding control system.

DESCRIPTION OF THE PREFERRED EMBODIMENT

Figure 1:
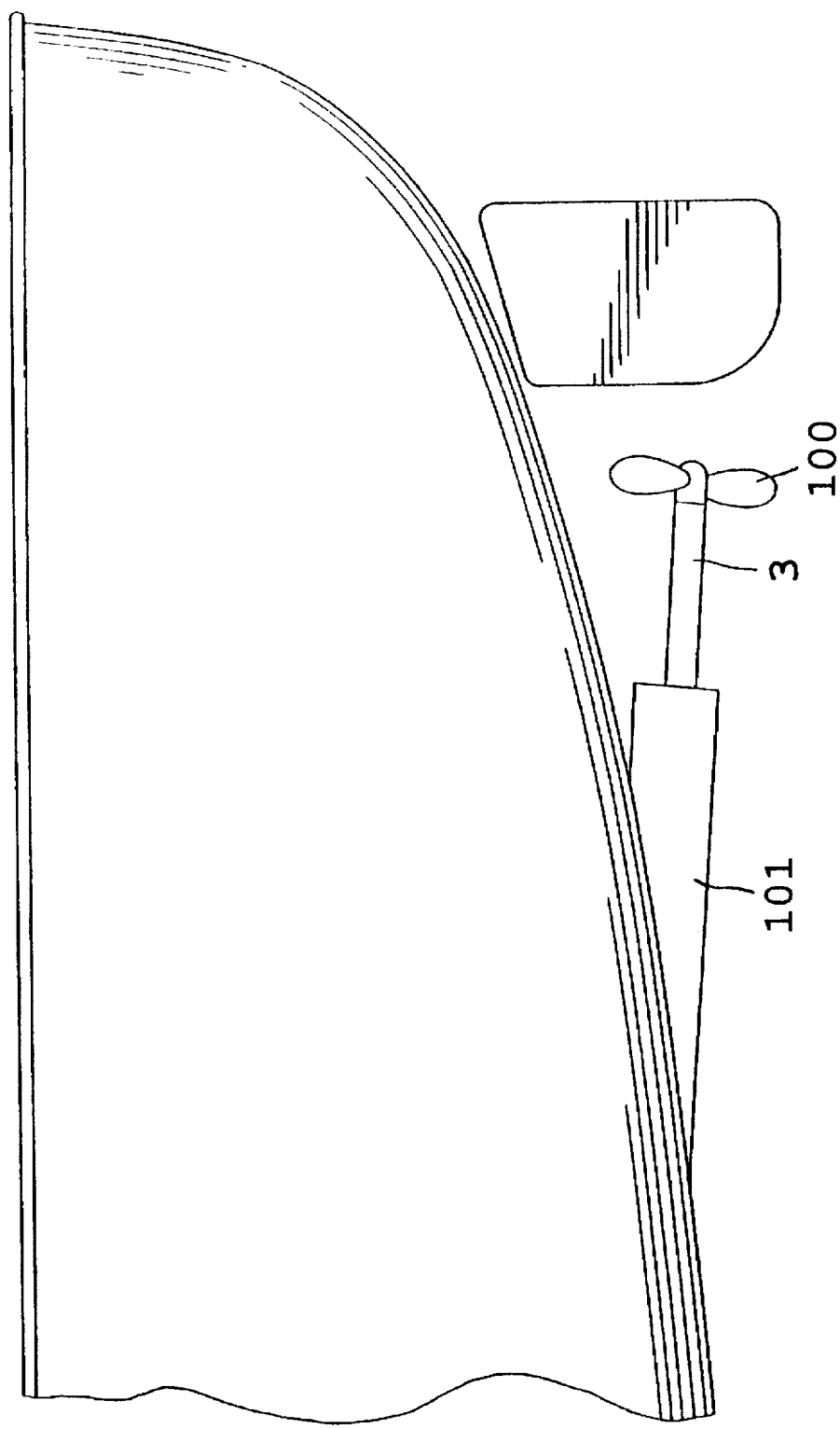
FIG. 1 shows an external view of a portion of a deep-draft or seagoing vessel.

FIG. 1 generally shows the bottom rear portion of a hull of a typical deep-draft or seagoing vessel with a single propeller 100. A propeller shaft 3 passes from the interior of the ship to the exterior thereof through a stern tube 101. The propeller 100 can preferably be affixed to the end of the shaft 3.

Figure 2:
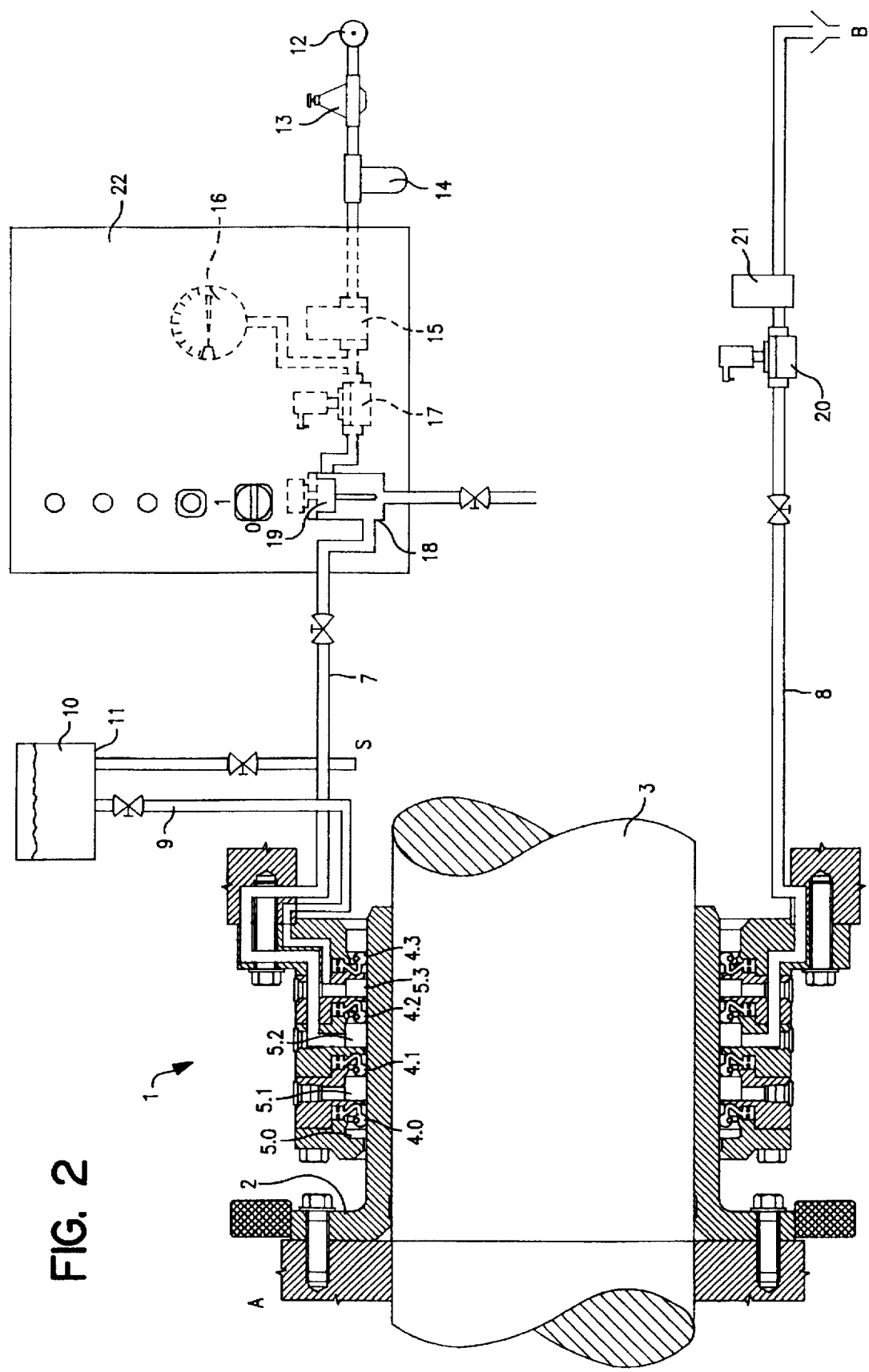
FIG. 2 shows the longitudinal section of an aft seal system for a ship's propeller shaft, as well as the corresponding control system with a safety device in accordance with the present invention, including the switching and control panel.
Figure 2A:
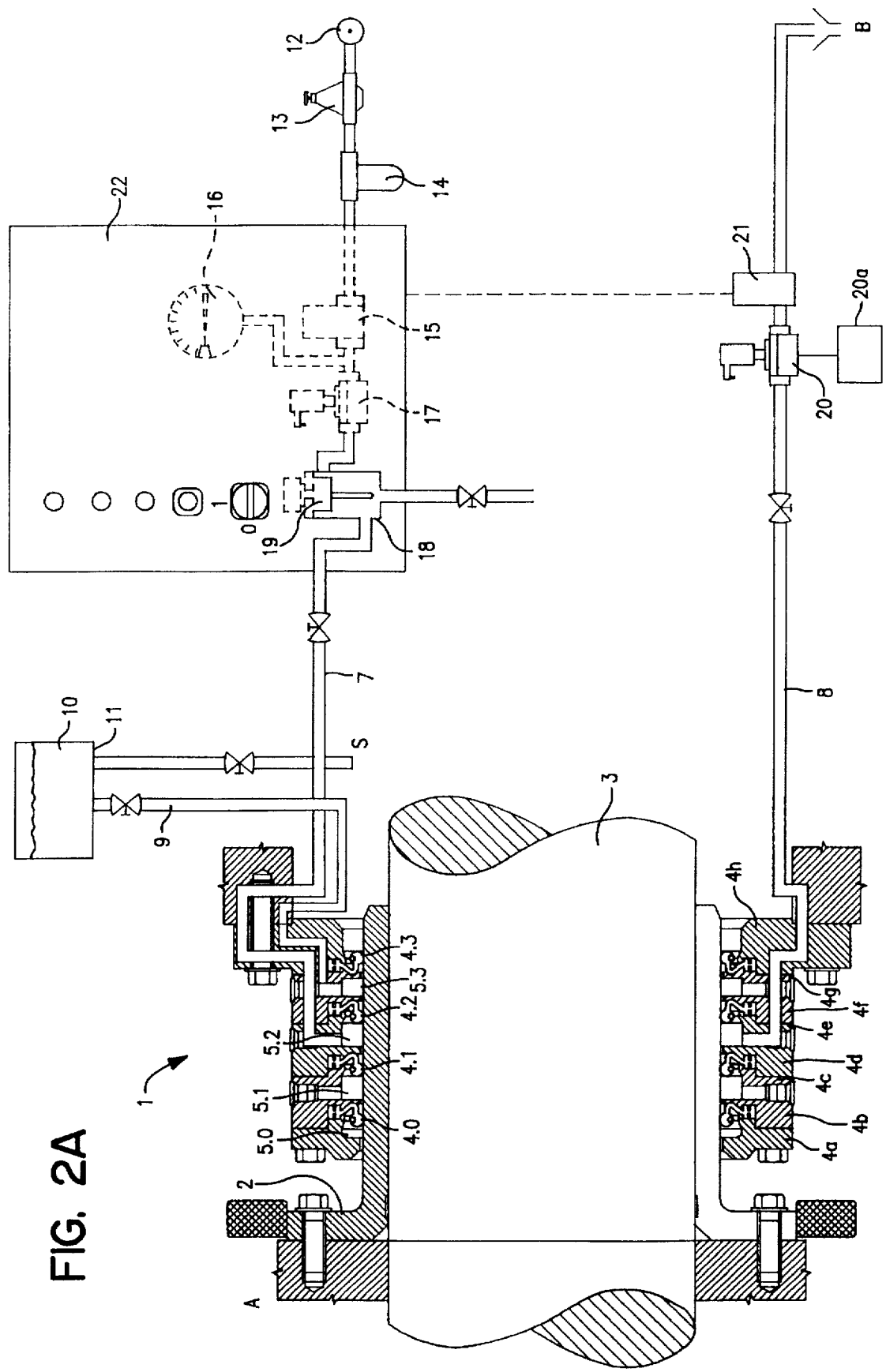
FIG. 2a shows substantially the same view as FIG. 2, but shows additional components.

Turning now to FIGS. 2 and 2a, the seal system 1, in accordance with the present invention, can preferably be equipped with four gaskets 4.0–4.3, which gaskets 4.0–4.3 interface with a bushing 2 of the ship's propeller shaft 3. In this case, the four gaskets 4.0–4.3 can be lip seals, each of which can be clamped between two stationary housing rings. Three of the gaskets can be directed toward the outside water A, while one can be directed toward a lubrication chamber S. In addition, ring-shaped chambers 5.0–5.3 can be reserved between each two gaskets. The aftmost gasket 4.0 can be used primarily to keep out dirt, while the neighboring gasket 4.1, together with its ring-shaped chamber 5.1, which chamber 5.1 can be designed as a circulator for outside water, can be used to cool the gaskets.

In accordance with one embodiment of the present invention as shown in FIG. 2a, gasket 4.0 can be clamped between a housing ring 4a and a housing ring 4b, gasket 4.1 can be clamped between a housing ring 4c and a housing ring 4d, gasket 4.2 can be clamped between a housing ring 4e and a housing ring 4f, and gasket 4.3 can be clamped between a housing ring 4g and a housing ring 4h.

The ring-shaped chamber 5.2 which lies between the forwardmost gasket 4.2 on the outside water side and the neighboring gasket 4.1 on the outside water side can be provided with a feed line 7 for a gaseous medium, in this case compressed air, and with a discharge channel 8. The ring-shaped chamber 5.3 which lies between the lubricant-side gasket 4.3 and the adjacent outside water side gasket 4.2 can be equipped with a feed channel 9 for the lubricant 10, which lubricant can be fed by gravity from a ventilated deep tank 11.

The feed line 7 for the compressed air can preferably originate from a pressure source 12, and in the direction of the sealing system, can contain the following units connected in sequence one after another: a pressure relief valve 13, a condensate trap 14, a pressure relief valve 15, a manometer or possibly a pressure gauge 16, a second solenoid valve 17 and an air-tight container 18 with a float switch 19.

The discharge channel 8 can empty into the interior of the ship (bilge) B and contains, located one after the other in the direction of the outlet, a first solenoid valve 20 and a pressure switch 21. In accordance with one embodiment of the present invention, the pressure switch 21 can preferably be embodied by a manometric switch, examples of which are given at the close of the instant specification. These units can be designed and electrically connected so that during normal operation, the second solenoid valve 17 can be held open, the first solenoid valve 20 periodically opens and closes the discharge channel 8 automatically, and the pressure switch 21 is in the open position. During abnormal operation, in the event of a blockage in the discharge channel 8 and thus, over time, a flooding of the ring-shaped chamber 5.2, the feed line 7 and the container 18 with fluid, the float switch 19 can close the second solenoid valve 17, whereupon a flooding of the other units of the feed line 7 is prevented, while due to the pressure increase in the discharge channel 8, the pressure switch 21 moves into the closed position and trips a visual electrical signal. In accordance with one embodiment of the present invention, the pressure switch 21 can preferably trip a visual signal in a control panel 22, discussed further below, for example in the form of a light. Alternatively, the pressure switch 21 could trip an acoustic alarm in control panel 22.

FIGS. 2 and 2a illustrate a situation in which there is a malfunction caused by a blockage of the discharge channel 8, and a backup of fluid (illustrated as the dark fluid) into the feed line 7 has occurred, whereby the container 18 is filled, i.e. the float switch 19 has already tripped and has closed the second solenoid valve 17.

If, during normal operation (i.e. loading or unloading of the ship), the outside water pressure should change, the pressure control mechanism 15 is preferably adjusted accordingly (i.e. manually).

There is preferably also a control cabinet (not shown) which has the switching and control panel 22, on which the displays and alarm mechanisms necessary for the operation and monitoring of the system are installed.

In accordance with one embodiment of the present invention, if necessary, valve 20 can be manually operated by means of a remote manual control switch 20a, which control switch 20a is shown schematically in FIG. 2a. Control switch 20a could conceivably be incorporated into control panel 22, or could be an auxiliary control switch.

Figure 3:
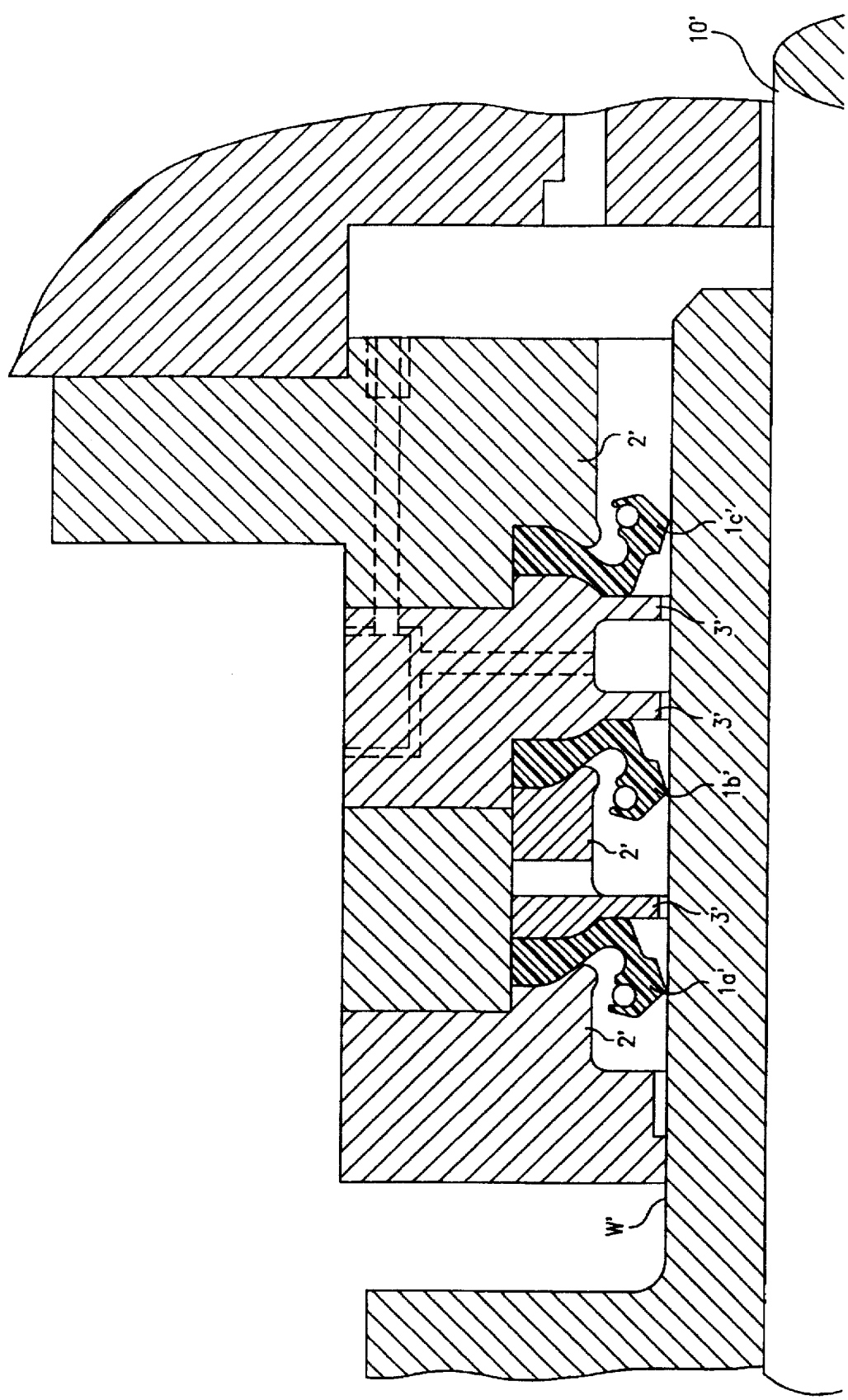
FIG. 3 shows a detailed illustration of a sealing system for a propeller shaft.

FIG. 3 shows a more detailed view of a lip seal arrangement for sealing a propeller shaft which arrangement can be considered to be analogous to the sealing system 1 of the present invention. Of course, FIG. 3 includes only 3 lip seals 1a', 1b', and 1c', while the present invention includes 4 such seals 4.0–4.3. The sealing arrangement of FIG. 3 is described in detail with relation to FIG. 1b of U.S. Pat. No. 5,411,273, which issued to Pietsch et al. on May 2, 1995. This U.S. Patent is hereby incorporated by reference herein. The reference numerals set forth in the aforementioned U.S. Patent, with relation to FIG. 1b thereof are each correspondingly represented in FIG. 3 of the instant application by the same reference numerals, but with the addition of a "prime" symbol.

The disclosure now turns to an additional example of a sealing system for the propeller shaft of a ship. It should be understood that the components discussed above with regard to FIGS. 1–3 can be considered to be interchangeable with similar components discussed herebelow with regard to FIGS. 4 and 5.

Figure 4:
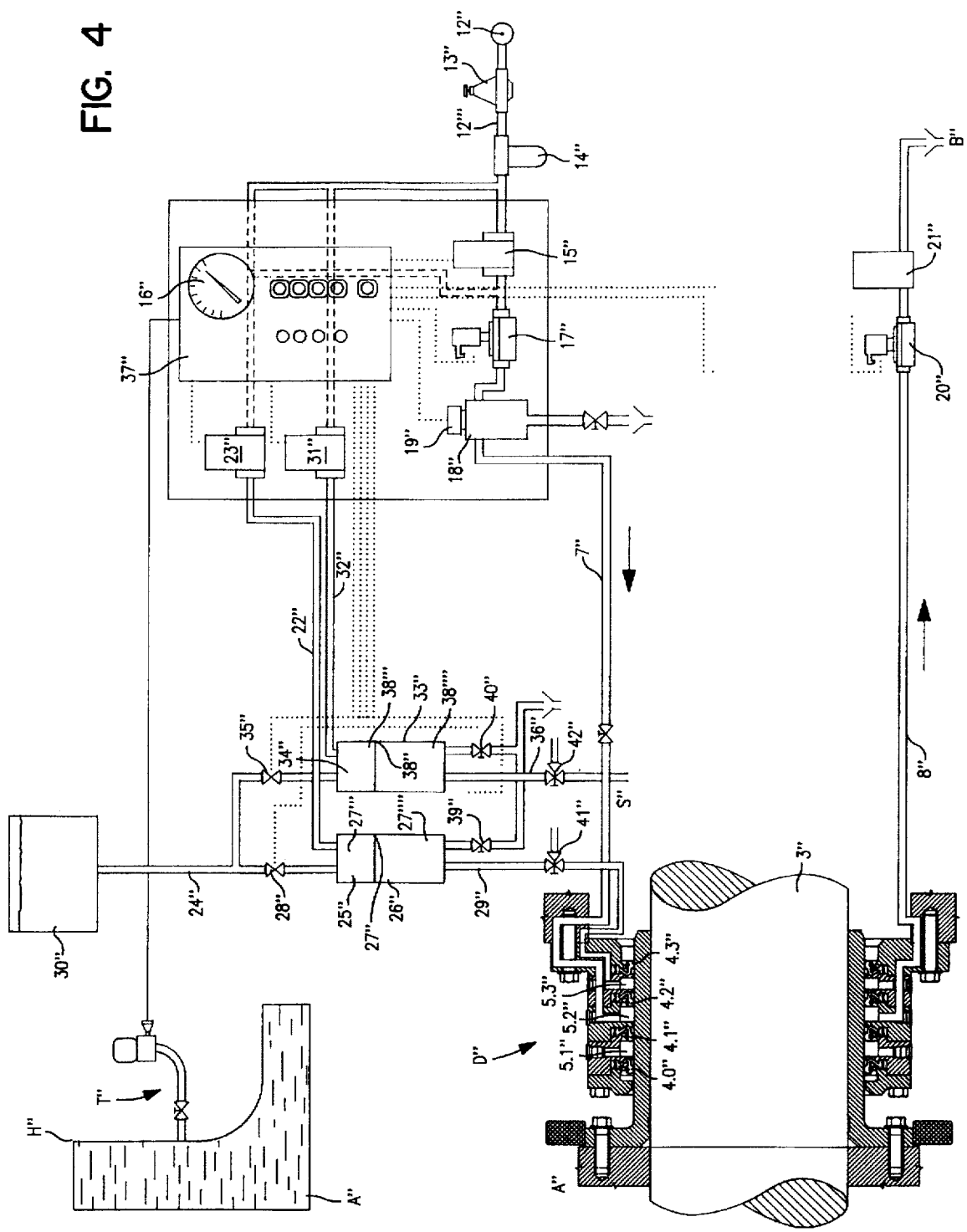

Turning now to FIGS. 4 and 5, the seal system D" is equipped with four gaskets 4.0"–4.3", in this case lip seals, which interact with the ships propeller shaft 3", and each of which can be clamped between two stationary housing rings. Three of the gaskets are preferably directed toward the outside water A", and one of the gaskets is directed toward a lubricant chamber S", whereby a ring-shaped chamber 5.1"–5.3" is reserved between each two gaskets.

The ring-shaped chamber 5.2" which lies between the forwardmost outside water-side gasket 4.2" and the neighboring outside water-side gasket 4.1" is provided with a feed line 7" for a gaseous medium, in this case compressed air, and with a discharge channel 8". The feed line 7" originates from a pressure source 12" and contains, located one after another in the direction of the seal system, a pressure relief valve 13", a condensate trap 14", a pressure control mechanism 15" for the compressed air, a manometer or pressure gauge 16", a solenoid valve 17" and an airtight container or tank 18" with a float switch 19". The last three units are part of a safety device which can prevent the flooding of the pressure control mechanism 15", which is described below in greater detail. The discharge channel 8" empties into the inside of the ship (B") and contains a solenoid valve 20", which solenoid valve 20" can be controlled so that it periodically opens and closes the discharge channel 8", so that any fluid which may have seeped into the ring-shaped chamber 5.2" and from there into the discharge channel 8" can be blown into the interior B" of the ship. The pressure control mechanism 15" for the compressed air can preferably operate so that it maintains a pressure of the compressed air in the ring-shaped chamber 5.2" which is preferably always slightly below the pressure of the outside water and of the lubricant, generally by 0.1–0.4 bar, whereby the set point can be determined by means of an electronic draft measurement system T", which is shown separately in the drawing and supplies electrical signals which correspond to the current draft H" of the ship.

In accordance with one embodiment, the term "draft" can be considered to represent the submerged depth of a ship.

This constant maintenance of a minimum pressure in the ring-shaped chamber 5.2" at all drafts is necessary to prevent lubricants from being discharged into the outside water A", which would result in pollution of the ocean water.

To also adjust the lubricant pressure to the current draft, the lubrication system, like the pressure medium system, can preferably be connected to the draft measurement system T". For this purpose, there can be a line 22" which is fed from the pressure source 12", and thus carries a gaseous medium, and in which line 22" there can be a pressure control mechanism 23" which maintains a specified pressure, and is actuated by the signals of the draft measurement system T" on the basis of the set point selected. After running through the pressure control mechanism 23", the line 22" preferably empties into the gas cushion 25" of a tank or container 26" which is externally airtight, and which container 26" can be connected on the input side by means of a feed line 24" to a ventilated deep tank 30" for the lubricant, and on the outlet side by means of a discharge line 29" to the ring-shaped chamber 5.3" which is located between the lubricant-side gasket 4.3" and the neighboring gasket 4.2".

To maintain a specified lubricant level in the container 26", the container 26" can be equipped with a float switch 27", which float switch 27" can interact appropriately with a shut-off mechanism 28" which is installed upstream on the inflow side.

In accordance with one embodiment of the present invention, float switch 27" can preferably include a float switch 27'" for the limitation of fluid to a maximum level and can also include an additional float switch 27"" for the limitation of fluid to a minimum level. In addition, the container 26" can also be equipped with a shut-off mechanism 39" so that, if necessary, it can be emptied into the ship's interior (bilge).

In addition to the lubricant feed device described above, there can preferably be a second lubricant feed device which operates in the same manner as the one described above, and which can be equipped accordingly with a pressure control mechanism 31" in a line 32", which line 32" can be fed by pressure source 12", and an externally airtight container 33" with a gas cushion 34". The container 33" empties not into the ring-shaped chamber 5.3", but into the lubricant chamber S" upstream of the seal system by means of a feed line 36". In this embodiment, this second lubricant feed device can be connected by means of a shut-off mechanism 35" to the same deep tank 30" as the first, but it can also be fed from a separate deep tank (not shown).

In accordance with one embodiment of the present invention, to maintain a specified lubricant level in the container 33", the container 33" can preferably have a float switch 38" which interacts with the shut-off mechanism 35" which is installed upstream on the inflow side. Further, float switch 38" can preferably include a float switch 38'" for the limitation of fluid to a maximum level, and a float switch 38"" for the limitation of fluid to a minimum level. In addition, the container 33" can preferably be equipped with a shut-off mechanism 40" so that, if necessary, it can also be emptied into the ship's interior.

In accordance with one embodiment, all of the pressure mechanisms 15", 23", and 31" can be connected to pressure source 12" by a common line 12'".

In the case in which there is an obstruction or clog in the discharge channel 8", which clog, in spite of the periodic opening and closing of the solenoid valve 20", is not blown out of the channel 8", the above-mentioned safety device can be provided with a measure to prevent flooding of the pressure control mechanism 15". After a certain length of time in operation, on account of the underpressure which exists with respect to the outside water pressure and the lubricant pressure, outside water and possibly also lubricant can seep into the ring-shaped chamber 5.2" and into the feed line 7", whereby this fluid can be collected in the container 18", and can fill the container 18" up. This filling up of the container 18" can then actuate the float switch 19" to thereby close the solenoid valve 17". Further, due to the increased pressure in the discharge channel 8", a pressure switch 21" can preferably move into the closed position and can trip a visual or possibly acoustic signal, i.e. a light or an alarm, in a control panel 37". A control cabinet (not shown) can be provided with the control panel 37", in which the display and alarm mechanisms necessary for the operation and the monitoring of the system can be installed.

In the event that the control system of the system is taken out of operation as a result of a power failure or other malfunctions, there can preferably be ⅔-way valves 41", 42" installed in the discharge lines 29" and 36", respectively, which valves 41' and 42" supply the system with lubricant from a conventional deep tank system (not shown), so that the entire system can continue to be operated essentially without restrictions.

One feature of the invention resides broadly in the safety device for systems to seal a ship's propeller shaft against the outside water and against a lubrication chamber with a multiple seal, which is equipped on the outside water side with at least one gasket directed outward, and on the lubrication chamber side with at least one gasket directed inward, whereby between each two neighboring gaskets a ring-shaped chamber or annulus is reserved, at least one of which is pressurized via a feed line with a gaseous pressure medium, in particular compressed air, whereby the pressure of the pressure medium, by means of a pressure regulation mechanism interposed in the feed line, is constantly kept slightly lower than the pressure of the outside water and the pressure of the lubricant, and whereby connected to the pressurized ring-shaped chamber there is a discharge channel which empties into the interior of the ship (bilge), and in which there is a controlled shut-off mechanism, preferably a solenoid valve, which automatically and periodically opens and closes, and whereby the feed of the lubricant to the lubricant chamber takes place from a deep tank, the static level of which can be adjusted, by means of a lubricant feed line, characterized by the fact that in the feed line 7 to the ring-shaped chamber 5.2 behind the pressure regulation mechanism 15 there is a second shut-off mechanism 17, preferably a solenoid valve, and behind that there is a container 18 which is closed externally airtight with a float switch 19, which actuates the second shut-off mechanism 17, such that when the float switch 19 is tripped by fluid accumulating in the container 18, the second shut-off mechanism 17 closes.

Another feature of the invention resides broadly in the safety device characterized by the fact that a condensate trap 14 and a pressure relief valve 13 are integrated into the feed line 7 between the pressure regulation mechanism 15 and the pressure source 12.

Yet another feature of the invention resides broadly in the safety valve characterized by the fact that if necessary, the first shut-off mechanism 20 can be remotely operated manually.

Still another feature of the invention resides broadly in the safety device characterized by the fact that at some distance from the exit opening into the bilge B, a manometric switch or pressure switch 21 is integrated into the discharge line 8 which is opened at atmospheric air pressure, and in the event of an increase in pressure sends a visual electrical signal to the control cabinet.

A further feature of the invention resides broadly in the safety device characterized by the fact that a feed line 9 empties into the ring-shaped chamber 5.3 between the lubricant-side gasket 4.3 and the neighboring gasket 4.2, which feed line is supplied with the lubricant 10 from the deep tank 11 or from a separate deep tank.

Another feature of the invention resides broadly in the safety device characterized by the fact that there is a control cabinet in which all the electrical and pneumatic lines of the seal system come together, whereby this control cabinet has a switching and control panel 22 on which all of the displays and alarms necessary for the operation and monitoring of the system are installed.

Pressure switches which could be incorporated into the present invention are disclosed in the following U.S. Pat. Nos.: 4,150,268 to Stearley, Rowley, and Buckshaw on Apr. 17, 1979, entitled "Pressure Operated Switch Construction Having a One-piece Control shaft Bracket Structure"; 4,158,117 to Quilliam, Gallantree, and Watt, on Jun. 12, 1979, entitled "Pressure Sensitive Switch"; 4,160,139 to Johnston, on Jul. 3, 1979, entitled "Pressure Sensitive Switch"; 4,165,650 to Weissler, on Aug. 28, 1979, entitled "Dual Purpose Pressure Sensor"; 4,168,415 to Edwards, Penland, Warren, Roberts, on Sep. 18, 1979, entitled "Pressure Switch Having Modular Construction"; and 4,182,941 to Tashiro on Jan. 8, 1980, entitled "Improved Pressure Switch".

Relief valves which could be incorporated into the present invention are disclosed in the following U.S. Pat. Nos.: 4,142,549 to Autry on Mar. 6, 1979, entitled "Relief Valve"; 4,168,723 to Schneider on Sep. 25, 1979, entitled "Pressure Relief Valve"; 4,178,940 to Au on Dec. 18, 1979, entitled "Pressure Control Systems"; and 4,185,652 to Zintz, Fisher, and Gee on Jan. 29, 1980 entitled "Subaqueous Sequence Valve Mechanism".

Solenoid valves which could be incorporated into the present invention are disclosed in the following U.S. Pat. Nos.: 4,177,774 to Moshal on Dec. 11, 1979, entitled "Control Valves"; 4,180,241 to Fiedler on Dec. 25, 1979, entitled "Solenoid Operated Valve and Shut-Off Device"; and 4,195,667 to Moore and Price on Apr. 1, 1980 entitled "Solenoid Valve with Safety Control Circuit".

Manometers which could be incorporated into the present invention are disclosed in the following U.S. Pat. Nos.: 4,154,116, to Stahn and Gygax on May 15, 1979, entitled "Safety Manometer"; 4,157,043 to Peterson and Cianci on Jun. 5, 1979, entitled "Maximum Pressure Manometer"; 4,217,784 to Neubeck and Julien on Aug. 19, 1980, entitled "Tube Spring Manometer"; 4,967,600 to Keller on Nov. 6, 1990 entitled "Manometer"; and 4,297,081 to Irvin on Oct. 10, 1981 entitled "Liquid Level Control System".

Examples of control systems for valves which could be incorporated into the present invention are disclosed in the following U.S. Pat. Nos.: 5,218,997 to Dunwoody on Jun. 15, 1993, entitled "Digital Hydraulic Valve Control"; 5,280,770 to Satou, Takahashi, and Kitagawa on Jan. 25, 1994, entitled "Variable Valve Actuation Control System"; 4,752,258 to Hochleitner and Gross on Jun. 21, 1988 entitled "Device for Controlling a Cycloid Propeller for Watercraft"; and 5,318,269 to Oettinger and Latt on Jun. 7, 1994, entitled "Electronic Control System for Magnetic Valves Operated Individually or in Cascade".

Examples of control systems for ships which could be incorporated in the present invention are disclosed in the following U.S. Pat. Nos.: 4,301,759 to de Vries on Nov. 24, 1981 entitled "Control System, Particularly for Use on Ships"; 5,222,901 to Burkenpas on Jun. 29, 1993 entitled "Redundant Marine Engine Control System"; 5,336,120 to Maurer, Braig, Auer, Goebel, Schwarz and Voss on Aug. 9, 1994, entitled "Control System for Operating a Ship's Motive Installation"; 5,388,542 to Fischer, Drohula and L üneburg on Feb. 14, 1995 entitled "Water-Borne Ship and Method of Operation Thereof"; 5,038,269 to Grimble and Fairbairn on Aug. 6, 1991 entitled "Industrial Control Systems"; and 5,170,338 to Moritoki, Hagiwara, and Katayama on Dec. 8, 1992, entitled "Apparatus for Carrying Out Serial Control and Method of Controlling Said Apparatus".

Lip seal arrangements which could be incorporated into the present invention include the following U.S. Pat. Nos.: 4,984,811 to Kuwabara and Miyazaki on Jan. 15, 1991 entitled "Pressure Control System for Stern Tube Seals" 5,411,273 to Pietsch and von Bergen on May 2, 1995, entitled "Lip Seal to Seal a Shaft, In Particular a Ship's Propeller Shaft"; 5,219,434 to Von Bergen and Pietsch on Jun. 15, 1993 entitled "Sealing Arrangement for Rotating Propeller Shafts of Ships"; 5,137,116 to Von Bergen and Pietsch on Aug. 11, 1992 entitled "Sealing Device for A Rotating Shaft of a ship Propeller Shaft"; 5,356,320 to Von Bergen and Pietsch on Oct. 18, 1994 entitled "Seal Arrangement for Propeller Shafts of Ships"; and 4,984,968 to Laverion on Jan. 15, 1991 entitled "Variable Pitch Propellers".

Manometric switches which could be incorporated into the present invention include the following U.S. Pat. Nos.: 5,096,392 to Griebel, Kille, and Kistler on Mar. 17, 1992 entitled "Apparatus for Conveying Paints"; 4,740,356 to Huber on Apr. 26, 1988 entitled "Device for Producing a Gaseous Measuring Sample for Atomic Absorption Spectroscopy"; and 4,946,316 to Watermann and Schulze-Heiming on Aug. 7, 1990, entitled "Method and Device for Moving a Shield-Type Support Trestle".

Float switches which could be incorporated into the present invention include the following U.S. Pat. Nos.: 4,919,165 to Lloyd on Apr. 24, 1990 entitled "Rainfall Control for Irrigation Systems"; 5,017,748 to Sapiro on May 21, 1991 entitled "Float Switch With Buoyant Housing and Switch Operating Means Within the Housing"; 5,049,037 to Carson and Bender on Sep. 17, 1991 entitled "Automatic Well Pump Skimmer Level Control"; 5,089,676 to Duncan on Feb. 18, 1992 entitled "Liquid Level Float Switch"; 5,211,363 to Brown on May 18, 1993 entitled "Bilge Pump Bracket"; and 4,742,244 to Koerner on May 3, 1988 entitled "Electronic Float Switch Apparatus".

Some additional examples of shaft seals for sealing about propeller shafts of ships, including typical lip seals as briefly described above, can be found in the following U.S. Patents which have common inventors with the present invention: U.S. Pat. No. 4,395,141 to Günter Pietsch et al., issued on Jul. 26, 1983 and entitled "Bearing and Seal Assembly for Stern Tubes of Vessels"; U.S. Pat. No. 4,413,829 to G ünter Pietsch, issued on Nov. 11, 1983 and entitled "Shaft Sealing Assembly"; U.S. Pat. No. 4,413,830 to Günter Pietsch, issued on Nov. 8, 1983 and entitled "Seal Assembly for Rotating Shafts"; U.S. Pat. No. 4,448,425 to Ernst-Peter Von Bergen, issued on May 15, 1984 and entitled "Shaft Seal Assembly with Inflatable Annular Member"; and U.S. Pat. No. 5,137,116 to Ernst-Peter Von Bergen and Günter Pietsch, issued on Aug. 11, 1992 and entitled "Sealing Device for Rotating Shaft of a Ship Propeller Shaft".

Systems for measuring the draft depth of a ship and pressure control mechanisms which could be utilized in accordance with the present invention are disclosed in the following U.S. Pat. Nos.: 5,186,428 to Falkenberg on Feb. 16, 1993, entitled "Depth Gauge Tranducer Retractor Device"; 4,534,217 to Caus on Aug. 13, 1985, entitled "Measuring the Draft of a Vessel"; 4,622,912 to Bleke on Nov. 18, 1986, entitled "Draft Reduction System for Ships"; 4,495,880 to Maniscalco et al. on Jan. 29, 1985, entitled "Draft Assisted Delivery System"; 4,266,500 to Jurca on May 12, 1981, entitled "Hover Control System for a Submersible Buoy"; 4,995,014 to Hoornstra on Feb. 19, 1991, entitled "Low Frequency Hydrophone and Depth Sensor Assembly"; and 5,235,557 to Masreliez on Aug. 10, 1993, entitled "Combined Speed and Depth Sensor Transducer".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

The corresponding foreign patent publication applications, namely, Federal Republic of Germany Patent Application No. P 44 34 247.0, filed on Sep. 24, 1994, having inventors Günter Pietsch, Holger Hillig, Bodo Voss, and Ernst-Peter von Bergen, and DE-OS P 44 34 247.0 and DE-PS P 44 34 247.0, are hereby incorporated by reference as if set forth in their entirety herein.

Federal Republic of Germany Patent Application No. P 44 34 261.6, filed on Sep. 24, 1994, having inventors Günter Pietsch, Holger Hillig, Bodo Voss, and Ernst-Peter von Bergen and DE-OS P 44 34 261.6 and DE-PS P 44 34 261.6, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A ship comprising:
    a propeller shaft;
    a seal system to seal said propeller shaft of said ship against the outside water;
    said seal system defining a first annular space around said propeller shaft;
    a discharge line for the discharge of liquids from said first annular space;
    a gas pressure source for providing a gas under pressure;
    means for receiving a gaseous pressure medium into said first annular space; said means for receiving comprising a feed line for supply of the gas from said gas pressure source; and
    a safety device comprising:
        sensing means for sensing the accumulation of liquids in said feed line; and
        a valve in said feed line, controlled by said sensing means, to close said feed line.

2. The ship according to claim 1 including a shut-off mechanism;
    said shut-off mechanism being disposed in said discharge line; and
    said shut-off mechanism comprising means for automatically and periodically opening and closing said discharge lane.

3. The ship according to claim 2 comprising means for manual operation of said shut-off mechanism.

4. The ship according to claim 3 including a bilge; said discharge line being disposed to empty into said bilge.

5. The ship according to claim 4 including a pressure regulation mechanism for regulating gas pressure in said feed line;
    said pressure regulation mechanism being disposed in said feed line between said gas pressure source and said safety device.

6. The ship according to claim 5 wherein said sensing means further comprises an airtight container;
    said airtight container being disposed in said feed line.

7. The ship according to claim 6 wherein said sensing means further comprises a float switch for closing said valve;
    said float switch being disposed within said airtight container.

8. The ship according to claim 7 including a condensate trap;
    said condensate trap being disposed between said pressure regulation mechanism and said pressure source.

9. The ship according to claim 8 including a pressure relief valve;
    said pressure relief valve being disposed between said pressure source and said condensate trap.

10. The ship according to claim 9 including a pressure switch;
    said pressure switch being disposed on said discharge line;
    said pressure switch being disposed between said shut-off mechanism and said bilge.

11. The ship according to claim 10 wherein said pressure switch is open to atmospheric pressure.

12. The ship according to claim 11 including control means;
    said control means comprising electric and pneumatic lines of said seal system;
    said control means comprising controller means;
    said controller means being connected to control said electric and pneumatic lines.

13. The ship according to claim 12 including;
    a visual alarm;
    a control cabinet for containing said controller means;
    said visual alarm being disposed on said control cabinet;
    said visual alarm comprising means for being activated by a signal from said pressure switch upon said pressure switch sensing an increase in pressure, above a predetermined pressure, in said discharge line.

14. The ship according to claim 13 wherein said seal system further comprises:
    a plurality of gaskets;
    at least one gasket directed inward, toward the center of the ship;

at least one gasket directed outward, away from the center of the ship; and said plurality of gaskets forming a second annular space around said propeller shaft.

15. The ship according to claim 14 including;

a lubricant supply;

a means for receiving said lubricant into said second annular space; said means for receiving comprising a lubricant feed line from said lubricant supply.

16. The ship according to claim 15 including:

said controller means comprising means for pressurizing said first annular space to a lower pressure than said second annular space; and said controller means comprising means for pressurizing said first annular space to a lower pressure than the outside water at a depth corresponding to the draft of said ship.

17. A ship comprising:

a hull;

said hull comprising:
- a bow;
- a stern;
- a length extending from said bow to said stern;
- first and second sides extending from said bow to said stern; and
- a width between said first and second sides;

an engine disposed within said hull;

a rotary propeller shaft driven by said engine;

a seal system to seal said rotary propeller shaft against the outside water;

said seal system defining an annular space around said rotary propeller shaft;

a discharge line for the discharge of liquids from said annular space;

a gas pressure source for receiving a gas under pressure;

means for receiving a gaseous pressure medium into said annular space;

said means for receiving comprising a feed line for supplying the gas from said gas pressure source; and a safety device comprising:
sensing means for sensing the accumulation of liquids in said feed line; and
a valve in said feed line, controlled by said sensing means, to close said feed line.

18. A safety device for a ship propeller seal comprising:

a pressure source for a gas under pressure; means for delivering a gaseous pressure medium to an annular region of a ship propeller seal;

said means for delivering comprising a feed line for supplying the gas from said gas pressure source to an annular region of a ship propeller seal;

sensing means for sensing an accumulation of liquids in a gas feed line and generating a signal upon sensing an accumulation of liquids in said feed line; and a valve in said feed line, controlled by said sensing means, to close said feed line.

19. The safety device according to claim 18 including a shut-off mechanism;
- a discharge line for the discharge of liquids from said annular region of a ship propeller seal;
- said shut-off mechanism being disposed in said discharge line; and
- said shut-off mechanism comprising means for automatically and periodically opening and closing said discharge line.

20. The safety device according to claim 19 including means for manual operation of said shut-off mechanism;

a bilge;

said discharge line being disposed to empty into said bilge;

a pressure regulation mechanism for regulating gas pressure in said feed line;

said pressure regulation mechanism being disposed in said feed line between said gas pressure source and said safety device;

said sensing means further comprises an airtight container;

said airtight container being disposed in said feed line;

said sensing means further comprises a float switch for closing said valve;

said float switch being disposed within said airtight container;

a condensate trap;

said condensate trap being disposed between said pressure regulation mechanism and said pressure source;

a pressure relief valve;

said pressure relief valve being disposed between said pressure source and said condensate trap;

a pressure switch;

said pressure switch being disposed on said discharge line;

said pressure switch being disposed between said shut-off mechanism and said bilge;

said pressure switch is open to atmospheric pressure; control means;

said control means comprising electric and pneumatic lines of said seal system;

said control means comprising controller means;

said controller means being connected to control said electric and pneumatic lines;

a visual alarm;

a control cabinet for containing said controller means;

said visual alarm being disposed on said control cabinet;

said visual alarm comprising means for being activated by a signal from said pressure switch, upon said pressure switch sensing an increase in pressure, above a predetermined pressure, in said discharge line;

the ship propeller seal comprising a plurality of gaskets;

at least one gasket directed inward, toward the center of the ship;

at least one gasket directed outward, away from the center of the ship said plurality of gaskets forming a second annular space around the propeller shaft;

a lubricant supply;

a means for receiving said lubricant into said second annular space;

said means for receiving comprising a lubricant feed line from said lubricant supply;

said controller means comprising means for pressurizing said first annular space to a lower pressure than said second annular space; and said controller means comprising means for pressurizing said first annular sapce to a lower pressure than the outside water at a depth corresponding to the draft of said ship.

* * * * *

UNITED STATES PATENT AND TRADEMARK OFFICE
CERTIFICATE OF CORRECTION

PATENT NO. : 5,643,026

DATED : July 1, 1997

INVENTOR(S) : Günter PIETSCH, Holger HILLIG, Bodo VOSS and Ernst-Peter VON BERGEN It is certified that error appears in the above-identified patent and that said Letters Patent is hereby corrected as shown below:

On the title page, item [56], under the FOREIGN PATENT DOCUMENTS section, before 6/1989, delete "374207" and insert --3742079--.

In column 8, line 9, after 'and' delete "L".

In column 8, line 10, before 'on', delete "üneburg" and insert --Lüneburg--.

In column 8, line 58, after 'to' delete "G".

In column 8, line 59, before 'Pietsch,', delete "ünter" and insert --Günter--.

In column 10, line 11, Claim 2, after 'charge', delete "lane." and insert --line.--.

Signed and Sealed this

Seventh Day of October, 1997

Attest:

BRUCE LEHMAN

Attesting Officer

Commissioner of Patents and Trademarks